(12) United States Patent
Wang et al.

(10) Patent No.: US 12,000,402 B2
(45) Date of Patent: Jun. 4, 2024

(54) ELECTRIC WATER PUMP

(71) Applicant: ZHEJIANG DUNAN ARTIFICIAL ENVIRONMENT CO., LTD., Shaoxing (CN)

(72) Inventors: Junjie Wang, Shaoxing (CN); Xiaowei Zhou, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 258 days.

(21) Appl. No.: 17/434,762

(22) PCT Filed: Jul. 15, 2020

(86) PCT No.: PCT/CN2020/102011
§ 371 (c)(1),
(2) Date: Mar. 14, 2022

(87) PCT Pub. No.: WO2021/013001
PCT Pub. Date: Jan. 28, 2021

(65) Prior Publication Data
US 2022/0220962 A1    Jul. 14, 2022

(30) Foreign Application Priority Data

Jul. 25, 2019    (CN) .......................... 201921185205.6

(51) Int. Cl.
*F04D 13/06*    (2006.01)
*F04D 29/02*    (2006.01)
(Continued)

(52) U.S. Cl.
CPC ......... *F04D 13/0606* (2013.01); *F04D 13/06* (2013.01); *F04D 13/064* (2013.01);
(Continued)

(58) Field of Classification Search
CPC .. F04D 13/0606; F04D 13/06; F04D 29/0473; F04D 29/043; F04D 29/026;
(Continued)

(56) References Cited

U.S. PATENT DOCUMENTS 10,393,121 B2 * 8/2019 Ye .......................... F04D 29/053
10,451,072 B2 * 10/2019 Aso ........................ F04D 13/026
2015/0369248 A1 * 12/2015 Noguchi ............... F04D 13/064
417/420

FOREIGN PATENT DOCUMENTS

CN         201155464 Y    11/2008
CN         207368776 U    5/2018
(Continued)

OTHER PUBLICATIONS

Raw Machine Translation of CN-207368776-U, "Electronic pump rotor subassembly and electronic pump", Chen et al., 2018.*
(Continued)

*Primary Examiner* — Charles G Freay
*Assistant Examiner* — Lilya Pekarskaya (57) ABSTRACT

An electric water pump including a rotor assembly, wherein the rotor assembly includes an iron core body having a central through-hole, a plurality of magnetic plates disposed inside the iron core body, a first plastic coating layer for enclosing the iron core body, and a second plastic coating layer. At least one protruding rib is provided on a top surface and/or a bottom surface of the first plastic coating layer, a recess matching the protruding rib is provided on the second plastic coating layer, and the first plastic coating layer can drive the second plastic coating layer to rotate relative to an axis of the central through-hole of the iron core body.

8 Claims, 6 Drawing Sheets

(51) Int. Cl.
*F04D 29/047* (2006.01)
*H02K 1/22* (2006.01)
*H02K 1/24* (2006.01)
*F04D 29/043* (2006.01)
*H02K 7/14* (2006.01)

(52) U.S. Cl.
CPC ....... *F04D 29/026* (2013.01); *F04D 29/0473* (2013.01); *H02K 1/22* (2013.01); *H02K 1/246* (2013.01); *F04D 29/043* (2013.01); *F05D 2210/11* (2013.01); *F05D 2300/43* (2013.01); *H02K 7/14* (2013.01)

(58) Field of Classification Search
CPC ....... F04D 13/064; F04D 13/08; H02K 1/246; H02K 7/14; H02K 15/12; H02K 1/22; F05D 2210/11; F05D 2300/43
See application file for complete search history.

(56) References Cited

FOREIGN PATENT DOCUMENTS

| | | |
|---|---|---|
| CN | 109322851 A | 2/2019 |
| CN | 210889358 U | 6/2020 |
| JP | 2009074470 A | 4/2009 |

OTHER PUBLICATIONS

Raw Machine Translation of CN109322851 (A), "Rotor impeller component, water pump motor comprising rotor impeller component, and method for manufacturing rotor impeller component" Jin et al., 2019.*

The extended European search report of 20844402.6.

* cited by examiner (PRIOR ART)

ELECTRIC WATER PUMP

CROSS-REFERENCE TO RELATED APPLICATIONS

This application is a National Stage application of international application No. PCT/CN2020/102011 filed on Jul. 15, 2020, titled "ELECTRIC WATER PUMP", in the China National Intellectual Property Administration, the content of which is hereby incorporated by reference.

TECHNICAL FIELD

The present disclosure relates to the field of flow rate control, and in particular, to an electric water pump.

BACKGROUND

Electric water pumps are widely used in new energy vehicles such as electric vehicles and hybrid electric vehicles, and is an important component of automotive thermal management systems. Electric water pumps are mainly used to cool components such as engines, turbochargers, batteries, motors, and controllers. In the electric water pump, a rotor assembly is an important component of the electric water pump, which affects the motor efficiency of the electric water pump. In addition, a structure and material of the rotor assembly directly affect the performance and cost of the electric water pump.

Figure 1:
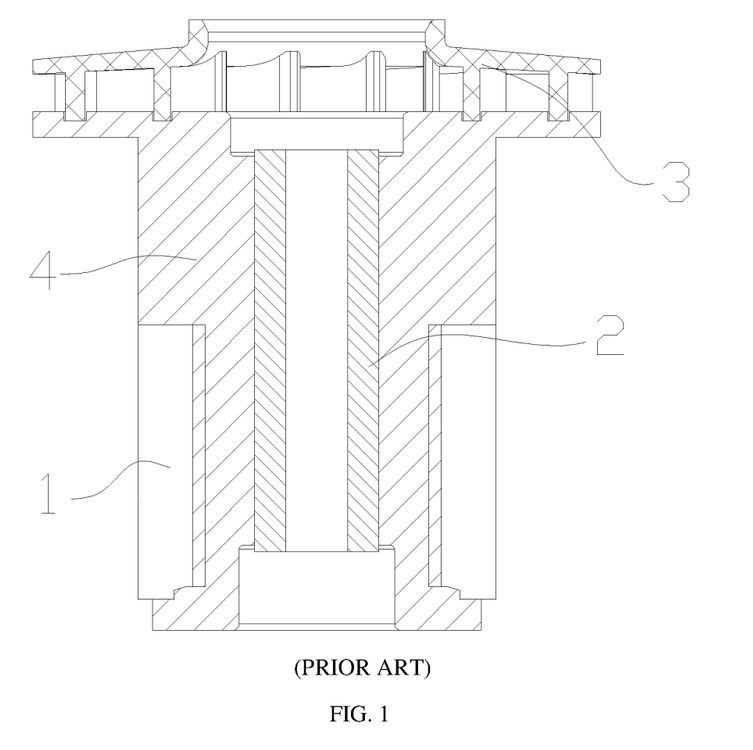
FIG. 1 is a cross section view of a rotor assembly in conventional art.

FIG. 1 shows a conventional electric water pump, including a magnetic ring 1, a graphite bearing 2, an impeller cover 3 and an injection molding adapting piece 4 configured for connecting the magnetic ring 1 and the graphite bearing 2. A magnetic performance of the magnetic ring 1 is an important factor affecting the rotor assembly. The conventional magnetic ring 1 is made of neodymium-iron-boron material directly by a process of molding injection, and a large amount of neodymium-iron-boron material is consumed, which results in a higher total cost of the rotor assembly. The graphite bearing 2 has a high wear resistance, which can protect the rotor assembly from wearing at high speed. However, since the graphite bearing 2 has a high wear resistance, it is difficulty to process and the cost is relatively high. Therefore, the overall cost of the electric water pump using the conventional rotor assembly is high. Moreover, the connection between the magnetic ring 1 and the injection molding adapting piece 4 of the conventional rotor assembly is easily disconnected, so that the magnetic ring 1 rotates, but the impeller cover disposed on the injection molding adapting piece 4 cannot be driven to rotate, making the whole rotor assembly ineffective.

SUMMARY

On the basis of embodiments of the present disclosure, an electric water pump is provided.

An electric water pump includes a pump housing, a stator assembly and a rotor assembly. The stator assembly is disposed in the pump housing and the rotor assembly matches with the stator assembly. The rotor assembly includes an iron core body, a first plastic coating layer, a second plastic coating layer and a plurality of magnetic sheets, wherein the iron core body is provided with a central through-hole. The plurality of magnetic sheets are disposed in the iron core body, the first plastic coating layer and the second plastic coating layer are configured for enclosing the iron core body. At least one protruding rib is disposed on a top surface, a bottom surface, or both a top surface and a bottom surface of the first plastic coating layer, and at least one recess matching with the at least one protruding rib is disposed on the second plastic coating layer. The first plastic coating layer is able to cause the second plastic coating layer to rotate relative to an axis of the central through-hole of the iron body by cooperation between the at least one protruding rib and the at least one recess.

In an electric water pump of the present disclosure, the magnetic sheet is disposed in the iron core body, and the first plastic coating layer is used to replace the conventional magnetic ring, so as to reduce consumption of the magnetic sheet, thereby reducing the cost. At the same time, the second plastic coating layer is used to replace the graphite bearing, which can further reduce the cost of the rotor assembly, thereby reducing the whole cost of an electric water pump using the rotor assembly in the present disclosure. At the same time, the at least one protruding ribs disposed on the first plastic coating layer can improve connection strength between the second plastic coating layer and the first plastic coating layer. Therefore, when the rotor assembly is assembled on the electric water pump and rotate at a high speed, the first plastic coating layer and the second plastic coating layer will not separate from each other, thereby improving reliability of the rotor assembly during use.

In some embodiments, a plurality of protruding ribs are disposed on at least one of the top surface and/or the bottom surface of the first plastic coating layer. Therefore, connection strength between the first plastic coating layer and the second plastic coating layer can be further strengthened.

In some embodiments, four protruding ribs are disposed on the top surface and/or the bottom surface of the first plastic coating layer, and the four protruding ribs are symmetrically disposed relative to the axis of the central through-hole of the iron core body. Therefore, the first plastic coating layer can cause the second plastic coating layer to evenly and stably rotate.

In some embodiments, a plurality of positioning grooves are disposed on an outer surface of the first plastic coating layer, and the plurality of positioning grooves matches with the plurality of magnetic sheets one by one, respectively. Therefore, it is convenient to locate the magnetic sheet, and to magnetize the magnetic sheet.

In some embodiments, each of the plurality of positioning grooves is disposed on a mid-vertical plane of corresponding one of the plurality of magnetic sheets. Therefore, a center line of the magnetic sheet can be accurately located with the positioning groove as a mark.

In some embodiments, a plurality of positioning holes are disposed on a bottom surface of the second plastic coating layer, and the plurality of positioning holes matches with the plurality of magnetic sheets one by one, respectively. Therefore, when the magnetic sheet needs to be magnetized, the magnetizing device can be disposed directly at the positioning hole. It is convenient to magnetize the magnetic sheet.

In some embodiments, the plurality of positioning holes are disposed on a center line of corresponding one of the plurality of magnetic sheets. Therefore, the magnetic sheets can be accurately located, so as to avoid influence on magnetizing caused by misplacing the magnetizing device.

In some embodiments, the plurality of positioning grooves extend from an edge of the first plastic coating layer to an opposite edge of the first plastic coating layer. Therefore, the magnetic sheet can be entirely located. Moreover, the plurality of positioning holes can be disposed referring to the plurality of positioning groove.

In some embodiments, the first plastic coating layer is disposed on the iron core body by a process of injection molding, and the second plastic coating layer is disposed on the first plastic coating layer a process of by injection molding. Therefore, a process of welding can be omitted.

In some embodiments, the protruding rib and the first plastic coating layer are an integral structure. Therefore, a process of welding can be omitted.

In some embodiments, an impeller cover is disposed on an end surface away from the iron core body of the second plastic coating layer, and the impeller cover is fixed to the second plastic coating layer by welding.

BRIEF DESCRIPTION OF THE DRAWINGS

In order to better describe and explain the embodiments and/or examples of those inventions disclosed herein, one or more drawings may be referred to. The additional details or examples used to describe the drawings should not be considered as limiting the scope of any of the disclosed inventions, the currently described embodiments and/or examples, and the best mode of these inventions currently understood.

IN THE DRAWINGS

100 represents an electric water pump; 10 represents a pump housing; 11 represents a center positioning shaft; 20 represents a stator assembly; 30 represents a rotor assembly; 31 represents an iron core body; 32 represents a magnetic sheet; 33 represents a first plastic coating layer; 331 represents a positioning groove; 34 represents a second plastic coating layer; 341 represents a positioning hole; 342 represents a recess; 35 represents an impeller cover; 301 represents a central through-hole; 302 represents a protruding rib; 1 represent a magnetic ring; 2 represents a graphite bearing; 3 represents an impeller cover; and 4 represents an injection molding adapting piece.

DETAILED DESCRIPTION

The present disclosure will be further described in detail below with reference to the drawings and specific embodiments, in order to better understand the objective, the technical solution and the advantage of the present disclosure. It should be understood that the specific embodiments described herein are merely illustrative and are not intended to limit the scope of the disclosure.

It should be noted that when an element is referred to as being "fixed" to another element, it may be directly attached to the other element or a further element may be presented between them. When an element is considered to be "connected" to another element, it may be directly connected to the other element or connected to the other element through a further element (e.g., indirectly connected).

Unless otherwise defined, all technical and scientific terms used herein have the same meaning as a skilled person in the art would understand. The terminology used in the description of the present disclosure is for the purpose of describing particular embodiments and is not intended to limit the disclosure.

Referring to FIG. 2 to FIG. 6, an embodiment of the present disclosure provides an electric water pump 100. The electric water pump 100 can be used as a thermal management system component of an electric vehicle and a hybrid electric vehicle, and is configured to supply power for working medium in the thermal management system to circulate. In some embodiments, the electric water pump 100 can be used for transporting other working medium in other pipeline systems.

Figure 2:
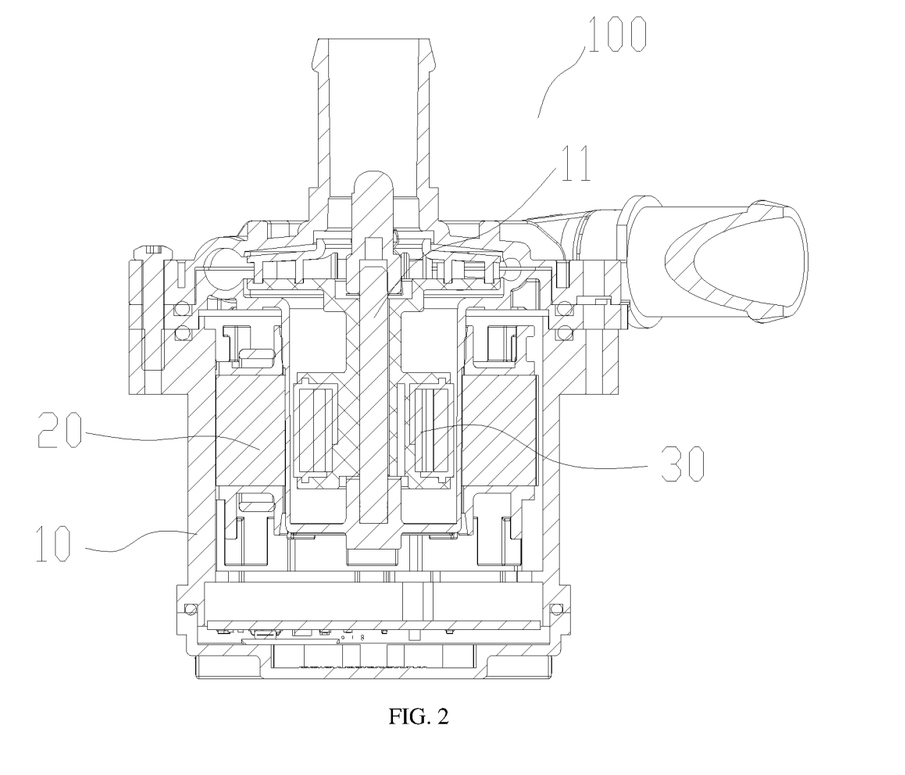
FIG. 2 is a cross section view of an electric water pump in an embodiment of the present disclosure.

An electric water pump 100 includes a pump housing 10, a stator assembly 20 and a rotor assembly 30. The stator assembly 20 can be disposed in the pump housing 10 and a rotor assembly 30 can match with the stator assembly 20. Wherein, a center position shaft 11 can be further disposed in the pump housing 10. The rotor assembly 30 can be sleeved on the center positioning shaft 11 and match with the stator assembly 20. The rotor assembly 30 can rotate relative to the center positioning shaft 11, so that the electric water pump 100 can control flow rate during use.

Figure 3:
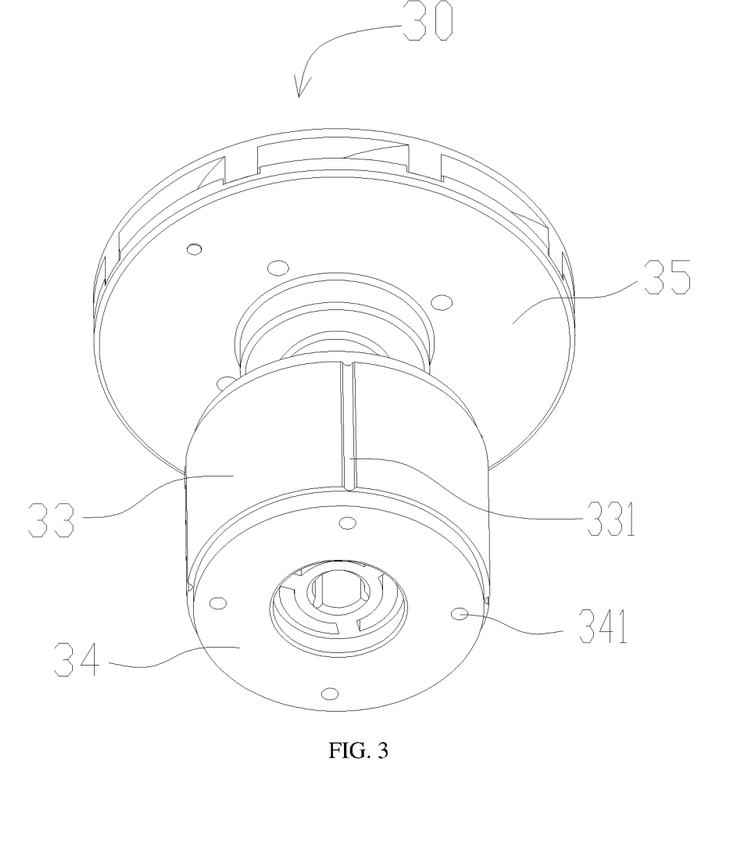
FIG. 3 is a structural schematic diagram of a rotor assembly of the electric water pump in FIG. 2.
Figure 4:
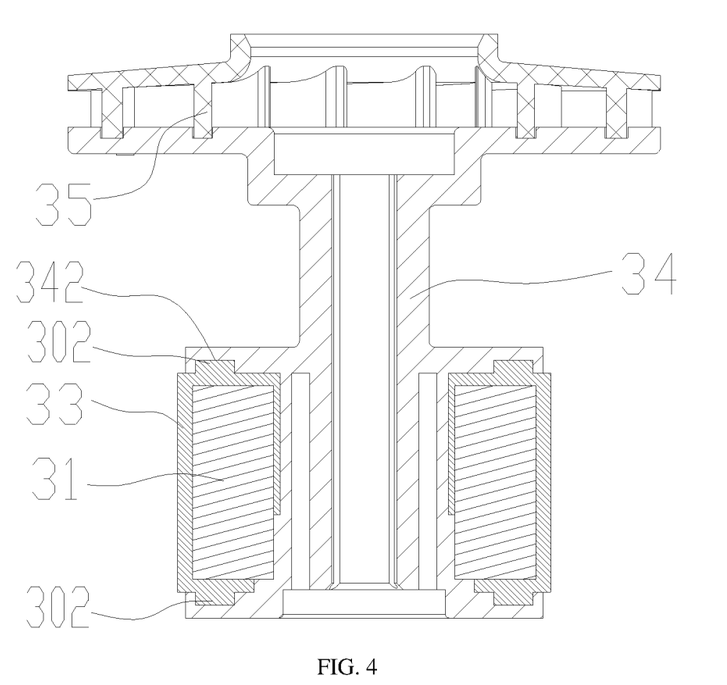
FIG. 4 is a structural schematic diagram of a rotor assembly of the electric water pump in FIG. 2.
Figure 5:
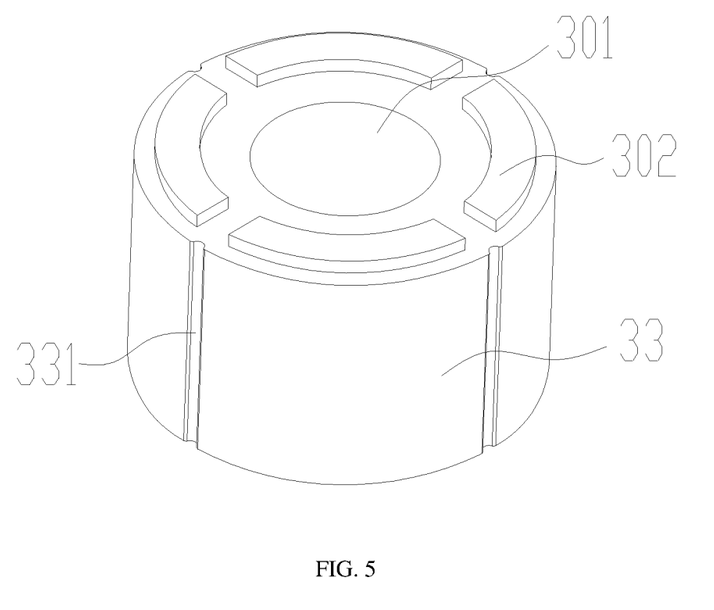
FIG. 5 is an assembly schematic diagram of a first plastic coating layer, an iron core body and a magnetic sheet in FIG. 3.
Figure 6:
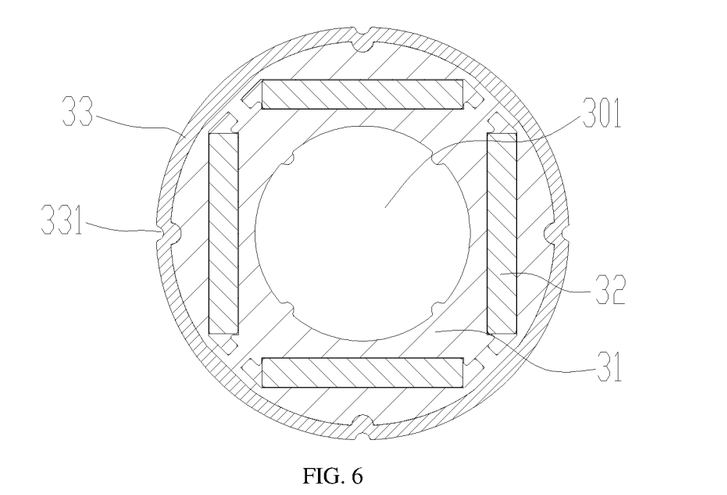
FIG. 6 is a cross section view of FIG. 5.

In the present embodiment, the rotor assembly 30 can include an iron core body 31, a first plastic coating layer 33, a second plastic coating layer and a plurality of magnetic sheets 32. The iron core body 31 can be provided with a central through-hole 301. The plurality of magnetic sheets 32 can be disposed in the iron core body 31. The first plastic coating layer 33 and the second plastic coating layer 34 can be configured for enclosing the iron core body 31. Wherein, an impeller cover 35 can be disposed on an end surface away from the iron core body 31 of the second plastic coating layer 34, and the impeller cover 35 can be fixed to the second plastic coating layer 34 by welding.

In some embodiments, the impeller cover 35 can be fixed to the second plastic coating layer 34 by ultrasonic welding. It can be understood that a product fixed by ultrasonic welding can have high strength and good tightness.

In some embodiments, the first plastic coating layer 33 can be disposed on the iron core body 31 by a process of injection molding, and configured for enclosing the iron core body 31. The second plastic coating layer 34 can be disposed on the first plastic coating layer 33 a process of by injection molding. Therefore, a process of welding can be omitted, and the technological process can be simpler.

It can be understood that a magnetic ring 1 of the rotor assembly 30 can be collectively formed by the iron core body 31, the plurality of magnetic sheets 32 and the first plastic coating layer 33. In conventional art, the magnetic ring 1 is made of neodymium-iron-boron material directly by a process of molding injection, which has a high cost. Moreover, in the present embodiment, the second plastic coating layer 34 can be disposed on the first plastic coating layer 33. That is, the second plastic coating layer 34 in the rotor assembly 30 of the present embodiment can be used to replace the graphite bearing 2 in a conventional rotor assembly. Therefore, the graphite bearing 2 can be omitted, so as to reduce the cost. It should be noted that the second plastic coating layer 34 can be made of anti-wear materials such as a combination of PPS (i.e. Phenylenesulfide) and carbon fiber, and the like. Comparing with the graphite bearing 2, the second plastic coating layer 34 is easy to process and has a low cost. When the rotor assembly 30 is assembled on the electric water pump, the second plastic coating layer 34 can make the rotor assembly 30 to rotate relative to the center positioning shaft 11 at a high speed, and the second plastic coating layer 34 will not be damaged by contact friction between the second plastic coating layer 34 and the center positioning shaft 11. The first plastic coating 33 can be made of heat-resisting materials such as a combination of PPS and glass fiber, nylon and the like.

In the present embodiment, at least one protruding rib 302 can be disposed on at least one of a top surface and a bottom surface of the first plastic coating layer 33, and at least one recess 342 matching with the at least one protruding rib 302 can be disposed on the second plastic coating layer 34. The first plastic coating layer 33 can be able to cause the second plastic coating layer 34 to rotate relative to an axis of the central through-hole 301 of the iron core body 31 by cooperation between the at least one protruding rib 302 and the at least one recess 342. The first plastic coating layer 33 can make use of cooperation between the protruding rib 302 and the recess 342 to cause the second plastic coating layer 34 to rotate, thereby improving a connecting strength between the first plastic coating layer 33 and the second plastic coating layer 34. Therefore, when the rotor assembly 30 is assembled on the electric water pump 100 and rotates at a high speed, the first plastic coating layer 33 and the second plastic coating layer 34 will not separate from each other, thereby improving reliability of the rotor assembly 30 during use.

The at least one protruding rib 302 can be disposed on at least one of the top surface and the bottom surface of the first plastic coating layer 33. That is, at least one protruding rib 302 can be disposed on the top surface of the first plastic coating layer 33, and the bottom surface of the first plastic coating layer 33 is not provided with the protruding rib 302; alternatively, at least one protruding rib 302 can be disposed on the bottom surface of the first plastic coating layer 33, and the top surface of the first plastic coating layer 33 is not provided with the protruding rib 302; or, at least one protruding rib 302 can be disposed on both the top surface of the first plastic coating layer 33 and the bottom surface of the first coating layer 33, thereby further improving the connecting strength between the first plastic coating layer 33 and the second plastic coating layer 34. Thus, the protruding rib 302 and the first plastic coating layer 33 can have an integral structure.

In details, in the present embodiment, four protruding ribs 302 can be disposed on the top surface and/or the bottom surface of the first plastic coating layer 33, and the four protruding ribs 302 can be symmetrically disposed relative to the axis of the central through-hole 301 of the iron core body 31. Therefore, the first plastic coating layer 33 can cause the second plastic coating layer 34 to evenly and stably rotate. It should be noted that a number of the protruding ribs 302 on the top surface of the first plastic coating layer 33 and a number of the protruding ribs 302 on the bottom surface of the first plastic coating layer 33 is not limited to that shown in the figures. The skilled in the art can set different numbers of protruding ribs 302 on the top surface of the first plastic coating layer 33 and the bottom surface of the first plastic coating layer 33 according to actual needs. In addition, the electric water pump can include one, two, three, five, and even a plurality of protruding ribs 302. Besides, the protruding 302 is not limited to, symmetrically disposed relative to the axis of the central through-hole 301 of the iron core body 31, but can be disposed according to arbitrarily disposed according to actual needs.

In the present embodiment, a plurality of positioning grooves 331 can be disposed on an outer surface of the first plastic coating layer 33, and the plurality of positioning grooves 331 can match with the plurality of magnetic sheets 32 one by one, respectively. Therefore, in the rotor assembly 30 of the present embodiment, when the second plastic coating layer 34 is formed on the first plastic coating layer 33 by a process of injection molding, a location of the magnetic sheet 32 in the iron core body 31 can be confirmed by the positioning groove 331 on the first plastic coating layer 33, so as to facilitate magnetizing the magnetic sheet 32.

Furthermore, the plurality of positioning grooves 331 can extend from an edge of the first plastic coating layer 33 to an opposite edge of the first plastic coating layer 33. That is, the positioning groove 331 can runs along an outer surface of the first plastic coating layer 33 from the top surface of the first plastic coating layer 33 to the bottom surface of the first plastic coating layer 33. Therefore, the magnetic sheet 331 can be entirely located. Moreover, a plurality of positioning holes 341 can be disposed referring to the plurality of positioning grooves 331.

In details, each of the plurality of positioning grooves 331 can be disposed on a mid-vertical plane of corresponding one of the plurality of magnetic sheets. Therefore, a center line of the magnetic sheet can be accurately located with the positioning groove as a mark.

In the present embodiment, the rotor assembly 30 can include four magnetic sheets 32. The four magnetic sheets 32 can be evenly disposed in the iron core body 31 along a circumference direction of the iron core body 31. Correspondingly, four positioning grooves 331 can be disposed on the first plastic coating layer 33. In the present disclosure, a number of the magnetic sheet 32 can be not limited to that shown in the figures. The rotor assembly can include two, three, five and even much more magnetic sheets 32, and the plurality of magnetic sheets can be evenly disposed in the iron core body.

In the present embodiment, the plurality of positioning holes 341 can be disposed on the bottom surface of the second plastic coating layer 34. The plurality of positioning holes 341 can match with the plurality of magnetic sheets 32 one by one, respectively. When the a magnetizing device is magnetizing the magnetic sheet 32 of the rotor assembly 30, the plurality of positioning holes 341 on the second plastic coating layer 34 can be used to locate the magnetizing device, so as to facilitate locating the rotor assembly 30 on the magnetizing device, thereby facilitating magnetizing the magnetic sheet 32. Wherein, the plurality of positioning holes 341 can be disposed on a center line of the magnetic sheet 32 as required. That is, the positioning hole 341 and the magnetic sheet 32 share a same center line, thereby preventing the magnetizing device from misplacing.

In details, in the present embodiment, the positioning holes 341 on the second plastic coating layer 34 can be disposed referring to the plurality of positioning grooves 331 on the first plastic coating layer 33. That is, a line defined by a center of projection of the positioning groove 331 on the bottom surface of the second plastic coating layer 34 and a center of the bottom surface of the second plastic coating layer 34 is co-linear with the a line defined by a center of the positioning hole 341 and the center of the bottom surface. Therefore, the positioning holes 341 on the second plastic coating layer 34 can be located. In some embodiments, the positioning holes on the second plastic coating layer can be disposed according to actual needs, which will not be described in details herein.

In view of above, in an electric water pump 100 of the present disclosure, the magnetic sheet 32 is disposed in the iron core body 31, and the first plastic coating layer 33 is used to replace the conventional magnetic ring 1, so as to reduce consumption of the magnetic sheet 32, thereby reducing the cost. At the same time, the second plastic coating layer 34 is used to replace the graphite bearing 2, which can further reduce the cost of the rotor assembly 30, thereby reducing whole cost of an electric water pump 100 using the rotor assembly 30 in the present disclosure. At the same time, the at least one protruding ribs 302 disposed on the first plastic coating layer 33 can improve connection strength between the second plastic coating layer 34 and the first plastic coating layer 33. Therefore, when the rotor assembly 30 is assembled on the electric water pump 100 and rotate at a high speed, the first plastic coating layer 33 and the second plastic coating layer 34 will not separate from each other, thereby improving reliability of the rotor assembly 30 during use.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. An electric water pump, comprising:
   a pump housing, a stator assembly disposed in the pump housing and a rotor assembly matching with the stator assembly;
   wherein the rotor assembly comprises an iron core body, a first plastic coating layer, a second plastic coating layer and a plurality of magnetic sheets,
   wherein the iron core body is provided with a central through-hole, the plurality of magnetic sheets are disposed in the iron core body, the first plastic coating layer and the second plastic coating layer are configured for enclosing the iron core body;
   at least one protruding rib is disposed on a top surface and/or a bottom surface of the first plastic coating layer, and at least one recess matching with the at least one protruding rib is disposed on the second plastic coating layer, and
   the first plastic coating layer is able to cause the second plastic coating layer to rotate relative to an axis of the central through-hole of the iron core body by cooperation between the at least one protruding rib and the at least one recess;
   a plurality of positioning grooves is disposed on an outer surface of the first plastic coating layer, and the plurality of positioning grooves matches with the plurality of magnetic sheets one by one, respectively;
   each of the plurality of positioning grooves is disposed on a mid-vertical plane of corresponding one of the plurality of magnetic sheets, the plurality of positioning grooves is configured to facilitate magnetizing the plurality of magnetic sheets.

2. The electric water pump of claim 1, wherein a plurality of protruding ribs is disposed on the top surface and/or the bottom surface of the first plastic coating layer.

3. The electric water pump of claim 2, wherein four protruding ribs of the plurality of protruding ribs are disposed on the top surface and/or the bottom surface of the first plastic coating layer, and the four protruding ribs of the plurality of protruding ribs are symmetrically disposed relative to the axis of the central through-hole of the iron core body.

4. The electric water pump of claim 1, wherein a plurality of positioning holes is disposed on a bottom surface of the second plastic coating layer, and the plurality of positioning holes matches with the plurality of magnetic sheets one by one, respectively.

5. The electric water pump of claim 4, wherein the plurality of positioning holes is disposed on a center line of corresponding one of the plurality of magnetic sheets.

6. The electric water pump of claim 1, wherein the plurality of positioning groove extends from an edge of the first plastic coating layer to an opposite edge of the first plastic coating layer.

7. The electric water pump of claim 1, wherein the at least one protruding rib that is disposed on the top surface and/or the bottom surface of the first plastic coating layer and the first plastic coating layer have an integral structure.

8. The electric water pump of claim 1, wherein an impeller cover is disposed on an end surface away from the iron core body of the second plastic coating layer, and the impeller cover is fixed to the second plastic coating layer.

* * * * *